United States Patent [19]

Kennedy et al.

[11] 4,192,187
[45] Mar. 11, 1980

[54] FLOAT CONTROLLED VOLUMETRIC GAUGE

[76] Inventors: Russell J. Kennedy, 2 Grenville Rd., Kingston, Ontario, Canada, K7M 2C5; Samuel S. Lazier, 239 Albert St., Kingston, Ontario, Canada, K7L 3V4; Joe Zorzi, 1601 Peel St., City of Two Mountains, Quebec, Canada

[21] Appl. No.: 966,982

[22] Filed: Dec. 6, 1978

[30] Foreign Application Priority Data

Dec. 6, 1977 [CA] Canada .................................. 292519

[51] Int. Cl.² ............................................ G01F 23/08
[52] U.S. Cl. ..................................... 73/321; 33/126.5; 116/228
[58] Field of Search ......................... 73/321; 33/126.5; 116/327, 228

[56] References Cited

U.S. PATENT DOCUMENTS

| | | | |
|---|---|---|---|
| 1,466,671 | 9/1923 | Mori | 73/322.5 X |
| 1,629,758 | 5/1927 | Wilson | 73/321 |
| 1,933,522 | 10/1933 | Edwards | 73/321 |
| 1,967,631 | 7/1934 | Schweizer | 73/321 |
| 2,555,593 | 6/1951 | Lee | 73/321 |
| 2,853,042 | 9/1958 | Rivkin | 116/327 |
| 4,065,968 | 1/1978 | Sunagawa | 73/321 |
| 4,078,430 | 3/1978 | Pemberton et al. | 73/321 X |

FOREIGN PATENT DOCUMENTS

495136 11/1938 United Kingdom ...................... 73/321

*Primary Examiner*—Daniel M. Yasich
*Attorney, Agent, or Firm*—Stanley E. Johnson; Richard J. Hicks

[57] ABSTRACT

Apparatus for measuring changes in volumetric content of a storage tank having a predetermined relationship between changes in liquid level and the change in volumetric content. The apparatus includes a tape windable onto and off a reel co-acting with a counterweight. The tape has means at spaced intervals along a selected portion of the length thereof consisting of performations or, alternatively, at least one notched edge driving a digital counter through a drive pulley. The means at spaced intervals on the tape positively drives the counter with a controlled amount of slip between the tape and the counter driving mechanism corresponding to predetermined non-linear relationships that may exist between the float movement and volume change whereby there is a direct reading of changes in volumetric content of the storage tank throughout the entire extent of travel of the tape.

9 Claims, 5 Drawing Figures

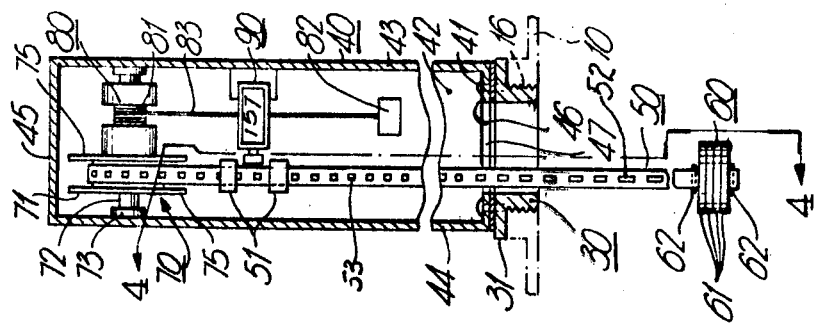
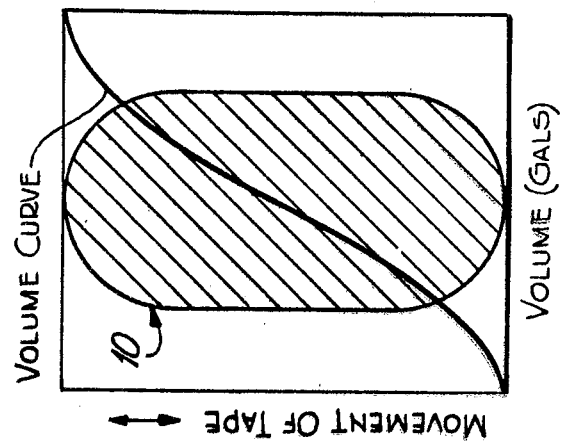
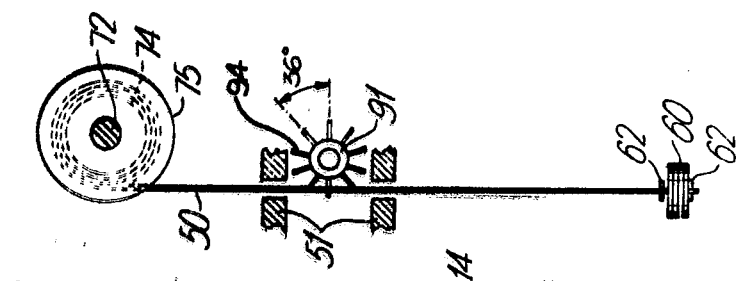
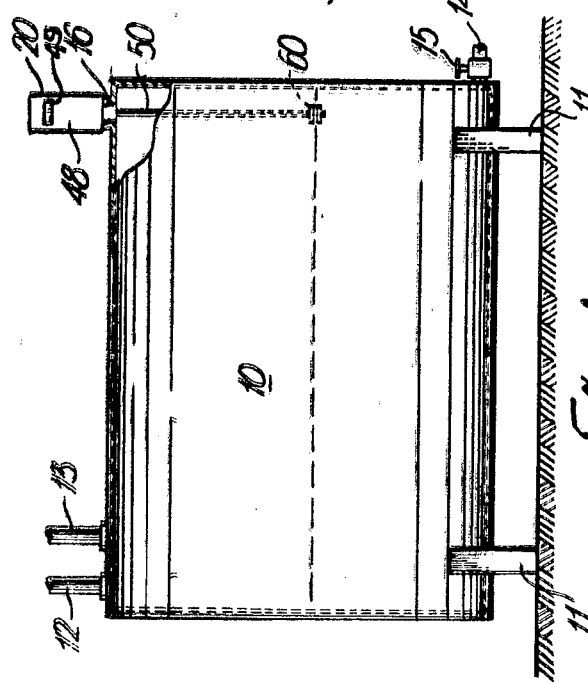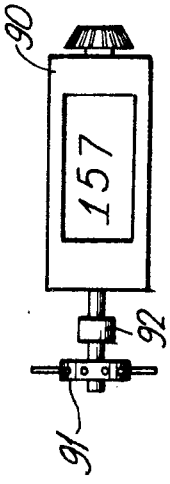

FLOAT CONTROLLED VOLUMETRIC GAUGE

This invention relates generally to a device for measuring changes in the volume of liquid in a storage tank and more particularly to a device for verifying the volume of liquid added periodically to the tank.

Residential and commercial establishments commonly use liquid fuel burning furnaces in their heating systems and the fuel supply therefor is normally stored in a tank on the premises. Periodically delivery trucks replenish the supply, metering from the truck the quantity added to the tank and the customer is billed for the metered amount. Although the metering may be extremely accurate, there is no guarantee such metered quantity is in fact actually added to the storage tank. Apparently unscrupulous delivery truck drivers have found ways and means of diverting a portion of the metered quantity to an empty or partially empty tank on the truck and thus defrauding the party paying for the metered quantity. While the normal residential fuel storage tank usually has a capacity of approximately 200 gal., the amount being added at any one time may, for example, be in the range of 100 to 175 gal. The homeowner has no way of knowing whether or not he has been defrauded of small amounts of, say, 5, 10 or 15 gallons, and although this may not in itself be a great loss on any one delivery, it can, over a period of time, have a substantial cumulative effect. The total quantity thus diverted can, of course, be substantial for the unscrupulous truck driver who normally makes deliveries to numerous residences each day during the heating season.

Accordingly, a principal object of the present invention is to provide a safe, relatively inexpensive and easily installable device capable of measuring the volume of fuel oil delivered and added to the fuel storage tank in a residential or commercial establishment.

A float controlled device is perhaps one of the simplest means for indicating changes of volume of liquid in a tank. The float moves with changes in the liquid level and such movement is translated by some means into volumetric measurement. Systems of this nature are generally known as exemplified by the teachings of U.S. Pat. No. 2,641,129 issued June 9, 1953 to J. F. Truckenbrodt, U.S. Pat. No. 3,074,274 issued Jan. 22, 1963 to H. Dickinson and U.S. Pat. No. 2,722,835 issued Nov. 8, 1955 to D. Ragland. These proposed systems however are either complicated and thus expensive or not particularly well suited or adapted for peculiarities encountered in standard fuel oil storage tanks. Residential storage tanks, for example, are slender vertically standing tanks with rounded top and bottom walls. The rounded walls result in a non-linear relationship between movement of the float and volume for that portion of the tank, thus rendering it difficult to accurately translate float movement into liquid volumetric change. Also because the tanks are slender, designed purposely so to minimize floor space requirements, the float has a considerable distance of travel between the limits of a substantially empty and a substantially full tank, and although this may be desirable for accurate measurement it complicates the problem of economically translating the movement into a volumetric reading gauge. Another problem peculiar to heating oil storage tanks is that they have a very restricted or limited size access opening to the interior of the tank for insertion of the float and/or other parts associated with the actuator for a measuring device.

Considering these various problems, applicants herein have devised a simple, relatively inexpensive but accurate measuring device for recording the changes in quantity of liquid in a storage tank. The float is constructed in such a manner it is easily insertable into the restricted access provided in the top wall of a standard fuel storage tank. A tape, acting in conjunction with a counter balance, moves linearly in response to movement of the float and has means thereon to actuate a counter that provides a direct reading of volumetric change even though the cross-section of the tank is non-uniform.

In keeping with the foregoing, there is provided particularly in accordance with the present invention a device for measuring changes in the volumetric content of a storage tank having a predetermined relationship between changes in liquid level and the change in volumetric content, comprising a housing having means to mount the same on the top side of the tank over an opening in such tank, a rotatable tap storage means in said housing, a tape having one end thereof wound onto said rotatable tape storage means and the other end thereof attached to a float located in said tank, said tape being withdrawable from the retractable into said storage means in response to movement of the float caused by a change in liquid level in the tank, guide means in said housing through which said tape passes during lineal movement of the tape, tension exerting means acting on said tape applying a selected tension thereto counteracting the weight of the float and tape depending from the tape storage means, a digital counter in said housing driven by the tape at a position adjacent said guide means during lineal movement of the tape by means located at spaced intervals on said tape, driving of said counter by said tape being a positive drive with a controlled amount of slip corresponding to a predetermined relationship existing between the float movement and volume change providing a direct reading of changes in volumetric content of the storage tank throughout the entire extent of travel of the tape.

The invention is illustrated by way of example with reference to the accompanying drawings wherein:

FIG. 1 is a side elevational view of a standard 200 gal. domestic fuel storage tank having a gauge provided in accordance with the present invention mounted thereon to indicate volume of fuel added to the tank;

FIG. 2 is a graph having superimposed thereon a cross-sectional view of the storage tank and illustrating the relation of volume of the tank relative to different liquid levels in the tank;

FIG. 3 is an enlarged front elevational view of the gauge shown in FIG. 1 with the front cover removed;

FIG. 4 is a partial side elevational view taken essentially along line 4—4 of FIG. 3; and FIG. 5 is an enlarged front elevational view of the counter and drive mechanism of the gauge.

Referring now in detail to the drawings, there is illustrated a conventional domestic fuel oil storage tank 10 supported on a pair of saddles 11 and connected to the uppermost wall thereof is a filler pipe 12 and vent pipe 13. An outlet in the lower portion of the tank is connected, for example, to the fuel supply line 14 of an oil burning furnace through a valve 15. Fuel storage tanks of this type are provided with a further threaded opening 16 in the upper wall in which there is conventionally mounted a fuel supply indicating gauge.

In accordance with the present invention, the conventional fuel supply indicating gauge is replaced by a gauge 20 that accurately measures and records the quantity of liquid fuel periodically added to the tank. The gauge may be read at any time to determine the quantity added avoiding the necessity of being present at the actual time when the supply tank is replenished with fuel. This is an important feature as a homeowner may not necessarily be present or, if present, actually be aware of the fact a further supply of fuel has been added.

The gauge 20 comprises in general a mounting bracket 30 and a casing 40 attached to the mounting bracket which together form a housing and mounting means for the device, a tape 50 having a float 60 attached to one end thereof and the other end retractable into and withdrawable from a tape storage mechanism 70, a tape tension exerting mechanism 80 and a counter 90.

The gauge mounting bracket 30 is an externally threaded ferrule that threads into the threaded opening 16 in the upper wall of the tank. The ferrule has an outwardly directed flange 31 to which the casing 40 is detachably mounted by studs 41. The casing is a rectangular box-like unit having a rear wall 42, opposed side walls 43 and 44, a top wall 45 and a bottom wall 46. The bottom wall 46 has an opening 47, the purpose of which will become apparent hereinafter. The casing has a removable front cover 48 providing ready access to the interior thereof and in which cover there is an aperture 49 exposing the reading on the counter.

The tape storage mechanism 70 consists of a reel 71 located within the casing and journalled for rotation by way of a shaft 72 supported at opposite ends on the side walls of the casing by means of respective ones of a pair of journals 73. The reel has a hub 74 located between respective ones of a pair of flanges 75 and on which hub there is wound one end of the tape 50.

The tension exerting mechanism 80 comprises a second reel 81, mounted on the shaft 72 and connected to reel 71 for rotation therewith, and a counterweight 82 suspended from a cord 83 wound on the reel 81. The reel 81 has a hub of substantially smaller diameter than the reel 71 and thus the distance of travel of the counterweight 82 is substantially less than that of the float 60.

Tape 50 winds onto the reel and is payed out therefrom in response to movement of the float as the liquid level changes in the storage tank. The tape passes through slots in respective ones of a pair of spaced apart tape guides 51 mounted in the casing and extends downwardly from the reel 71 through the opening 47 in the casing and through the ferrule, with the free end connected to the float 60.

The float consists of a plurality of superimposed layers 61 of a relatively buoyant material, for example, sheet cork larger in size than the opening of the threaded aperture 16 in the upper wall of the tank. The purpose of constructing the float of several layers of thin, flexible floatable material is to provide a unit which is relatively flexible permitting introduction of the same through the standard fitting or opening in the tank. The end of the tape may be connected to the float in any convenient manner as, for example, passing through aligned slots in the individual discs of the float, with the float being retained in position on the tape by a pair of pins 62 passing through the tape above and below respectively the uppermost and lowermost disc. With this arrangement it is possible to insert discs 61 individually into the tank and thereafter insert the uppermost pin. If desired, such uppermost pin may be replaced by a clip slidably disposed on the tape and held in final position by being crimped.

The counter 90 is a digital counter mounted in the casing and driven by a sprocket wheel 91 through a one-way clutch 92. A plurality of equally spaced spokes 94 radiate outwardly from a hub and project into perforations in the tape whereby, upon linear movement of the tape, the wheel is rotated driving the counter. Since the tape oscillates during respectively consumption of the fuel and replenishing the supply therein and it is desired to measure only the volume added, the one-way clutch 92 is arranged so that the counter is actuated only during filling of the tank. The one-way clutch 92 may be a separate element or, alternatively, incorporated in the counter mechanism. The counter mechanism and spoked wheel attached thereto is mounted in the casing with the wheel positioned between the pair of tape guides which ensure correct alignment so that the spokes remain in mesh with the perforations.

As will be seen from FIG. 2, there is a non-linear relationship between different liquid levels and volume of the tank for the upper and lower portions of the tank wherein the walls of the tank are curved. In order to provide a direct reading on the counter for the non-linear relationship, the tape has elongated slots 52 corresponding to such non-linear relationship causing effectively a controlled slip between the tape and rotation of the spoked wheel. The amount of slip is designed to correspond to the non-linear relationship providing a direct reading of the volume throughout the entire movement of the tape. Where the cross-sectional area of the tank is constant there is, of course, a linear relationship and on this corresponding portion of the tape the perforations 53 are of uniform shape. Throughout the entire length of the tape the distance between adjacent perforations is constant and thus the uniformly spaced spokes on the drive pulley remain always in mesh with the perforations providing a positive drive even though through a portion of movement of the tape there is a controlled amount of slip corresponding to the non-linear relationship.

Obviously, other indexing means may be used on the tape to drive the counter. For example, instead of having spokes of the counter drive wheel meshing with perforations in the tape, the drive wheel may be provided with equally spaced formations on the peripheral surface thereof mating with notches in the edge (or edges) of the tape.

The mechanism must be built to reasonably close tolerances but minor variations will not cause cumulative errors. The perforations in the tape (or notched edge or edges, as the case may be) are arranged so that, when the lower boundary of one perforation in the tape passes the axis of rotation of the drive wheel for the counter, the latter increases its reading by 1 and through the one-way clutch such reading occurs only when the tape is moving upwardly as viewed in FIGS. 3 and 4. When, say, the 157th slot passes the shaft, the counter will register the correct number of gallons even if there should be minor errors in the location in some of the previous slots. Counters which indicate 10 digits per revolution are readily available off the shelf and thus the entire mechanism, as will be apparent from the foregoing, may be readily and cheaply constructed and yet provides relatively accurate readings.

We claim:

1. Apparatus for measuring changes in the volumetric content of a storage tank wherein such storage tank has a predetermined relationship between changes in liquid level and the change in volumetric content, said apparatus comprising a housing having means to mount the same on the top side of the tank over an opening in such tank, a rotatable tape storage means in said housing, a tape having one end thereof wound onto said rotatable tape storage means and the other end thereof attached to a float located in said tank, said tape being withdrawable from and retractable into said storage means in response to movement of the float caused by a change in liquid level in the tank, guide means in said housing through which said tape passes during lineal movement of the tape, tension exerting means acting on said tape applying a selected tension thereto counteracting the weight of the float and tape depending from the tape storage means, a digital counter in said housing driven by the tape at a position adjacent said guide means during lineal movement of the tape by means located at spaced intervals on said tape, driving of said counter by said tape being a positive drive with a controlled amount of slip corresponding to a predetermined relationship existing between the float movement and volume change providing a direct reading of changes in volumetric content of the storage tank throughout the entire extent of travel of the tape.

2. The apparatus as defined in claim 1 wherein said tape storage means comprises a rotatably mounted reel.

3. The apparatus as defined in claim 2 wherein said tension exerting means comprises a second reel mounted for rotation with said tape storage reel and having a weight depending therefrom on a flexible member windable onto and off said second reel.

4. The apparatus as defined in claim 1 wherein said means at spaced intervals on said tape driving said counter comprises perforations in said tape equally spaced from one another along a selected portion of the length of the tape and wherein said digital counter is driven by a wheel having equally spaced spokes radiating outwardly therefrom and meshing with said perforations, said perforations having lengths in the lineal direction of the tape co-related to the relationship existing between float movement and volumetric content.

5. The apparatus as defined in claim 1 wherein said housing mounting means comprises an externally threaded ferrule threadable into a threaded access opening in the upper wall of a common fuel storage tank.

6. The apparatus as defined in claim 1 wherein said float comprises a plurality of sheets of thin flexible buoyant material superimposed one upon another.

7. The apparatus as defined in claim 1 wherein said counter provides a reading only of the volumetric content added to the storage tank.

8. The apparatus as defined in claim 1 wherein said means at spaced intervals on said tape for driving said counter comprise notches in said tape.

9. The apparatus as defined in claim 1 wherein said counter has a one way clutch in the drive thereof arranged to provide a counter reading only as to the quantity of liquid added to the tank.

* * * * *